April 18, 1950 L. A. SKINNER ET AL 2,504,160
ROCKET PROJECTOR
Filed Oct. 3, 1944 4 Sheets-Sheet 1
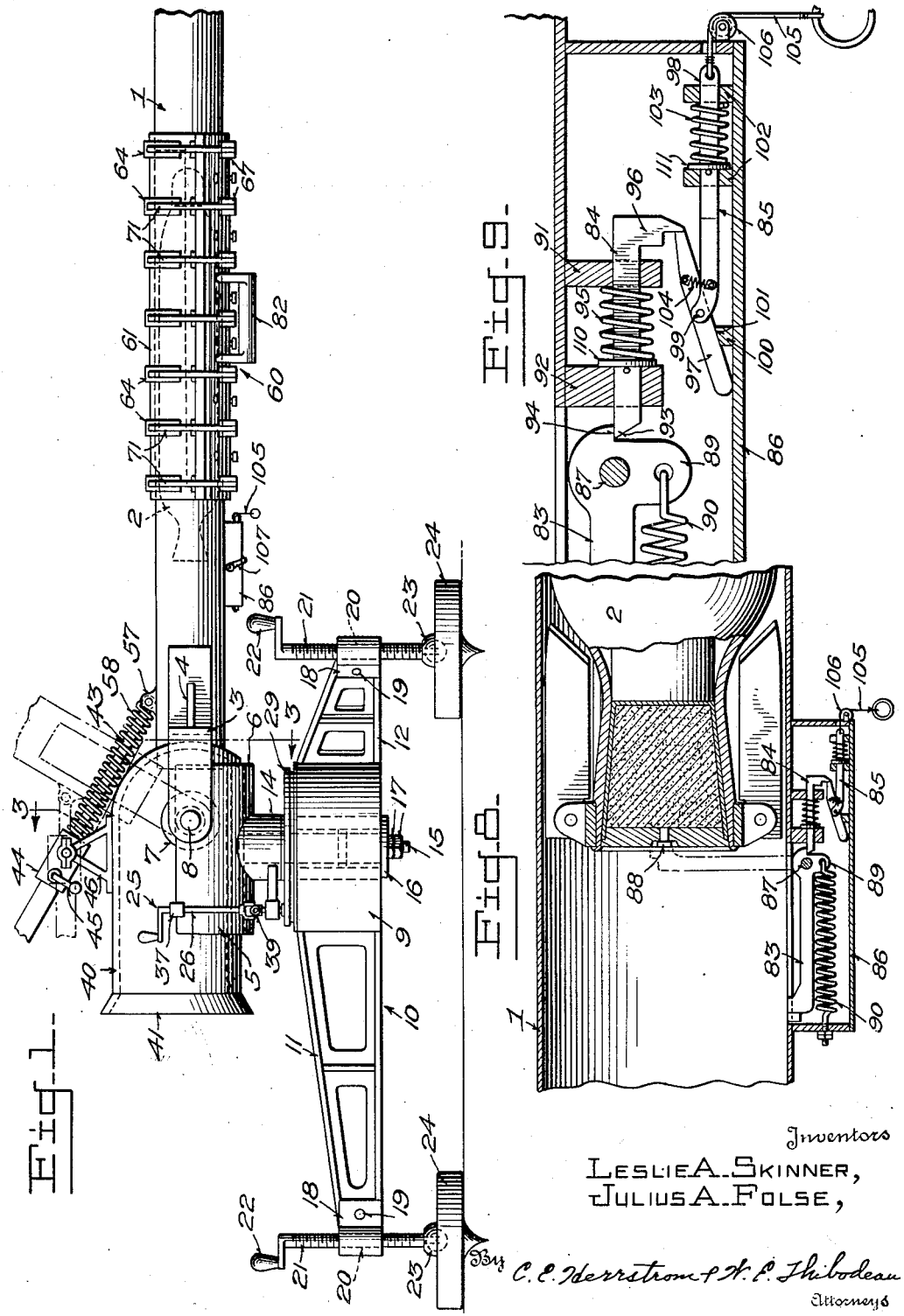
Inventors
LESLIE A. SKINNER,
JULIUS A. FOLSE,
By C. E. Herrstrom & W. E. Thibodeau
Attorneys

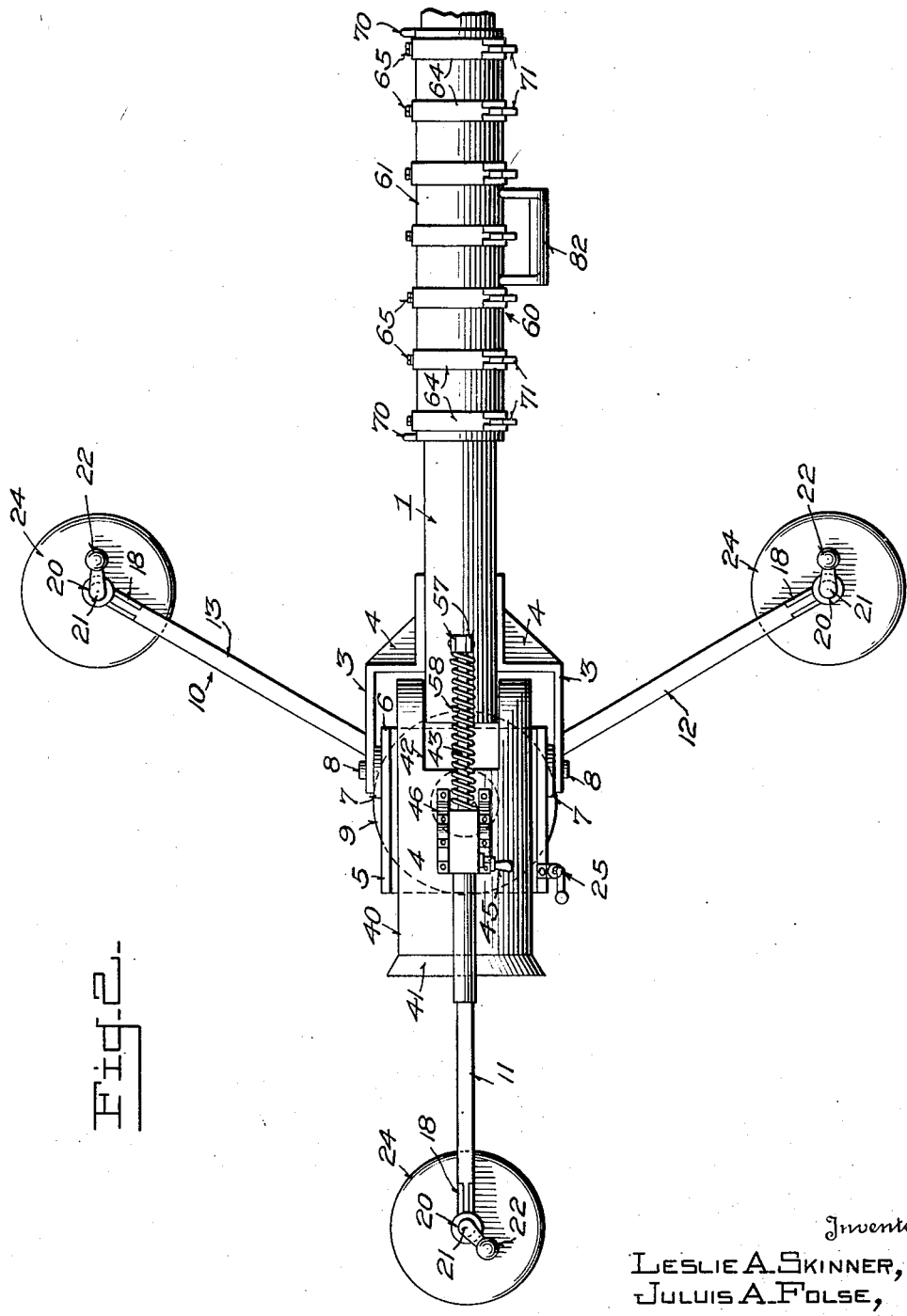

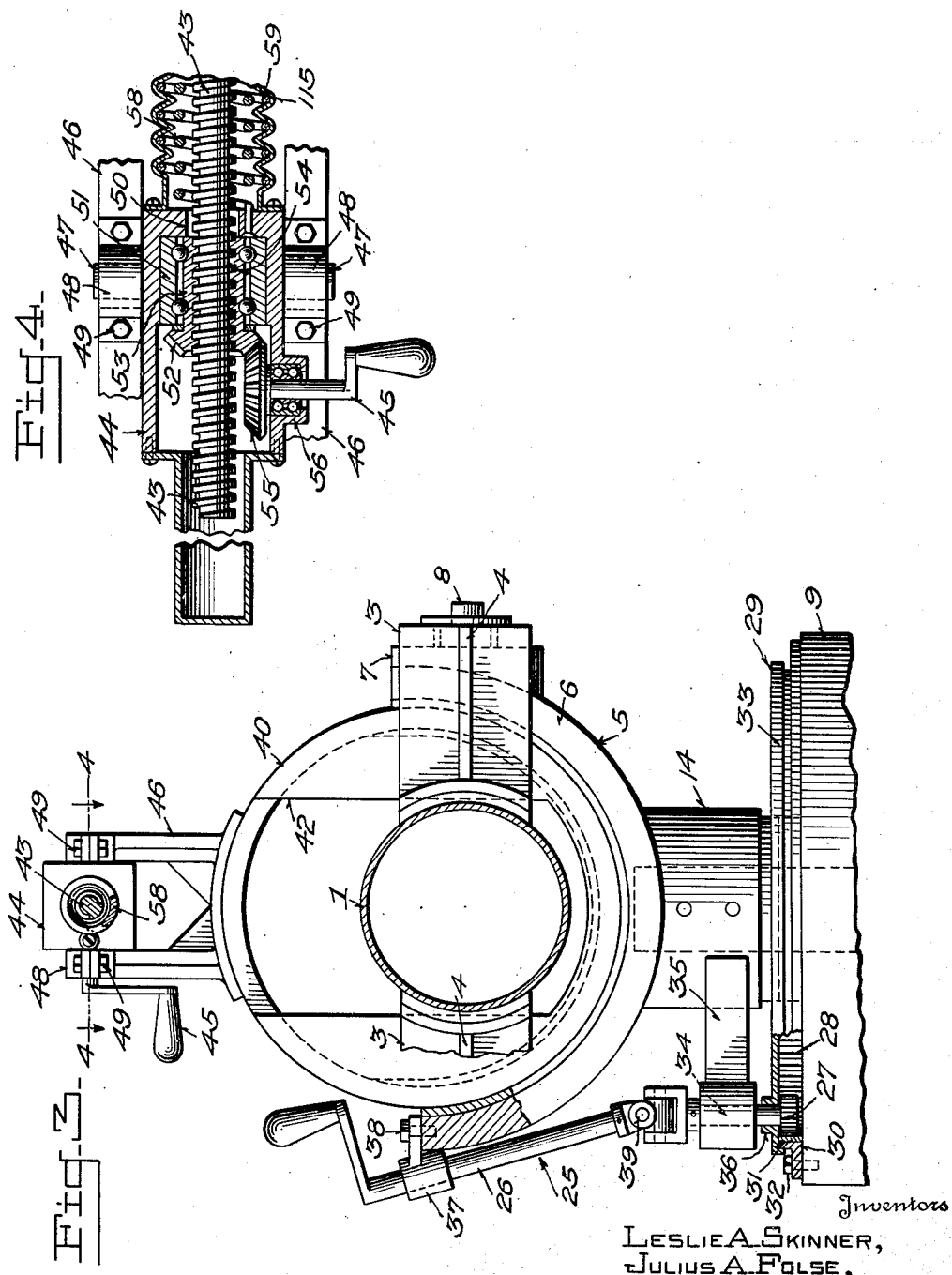

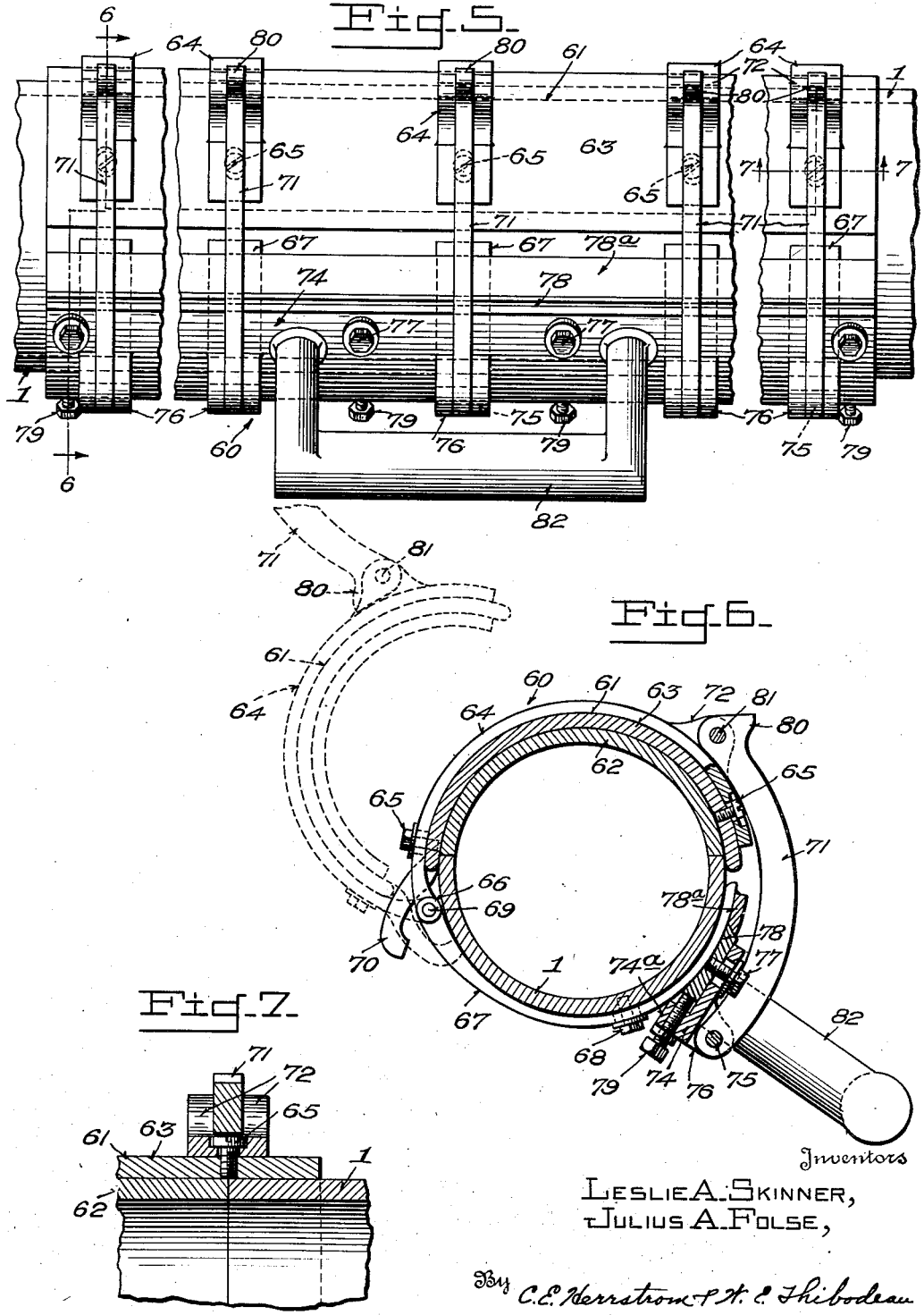

Patented Apr. 18, 1950

2,504,160

UNITED STATES PATENT OFFICE 2,504,160

ROCKET PROJECTOR

Leslie A. Skinner, Berkeley, Calif., and
Julius A. Folse, Miami, Fla.

Application October 3, 1944, Serial No. 557,040

4 Claims. (Cl. 89—1.7)

(Granted under the act of March 3, 1883, as
amended April 30, 1928; 370 O. G. 757)

The invention described herein may be manufactured and used by or for the Government for governmental purposes without the payment to us of any royalty thereon.

This invention relates to a rocket projector, more particularly to a gas deflector for mounted rocket projectors.

Accordingly, it is an object of this invention to provide a rocket projector mounted for vertical and horizontal movement with a gas deflector.

It is a further object of this invention to provide a rocket projector mounted for horizontal and vertical movement with a deflector that will deflect the rocket gases in but one plane regardless of the elevation of the projector tube.

The specific nature of the invention as well as other objects and advantages thereof will clearly appear from a description of a preferred embodiment as shown in the accompanying drawings in which:

Fig. 1 is a side elevational view of the rocket projector shown supported on a tripod mount.

Fig. 2 is a plan view of the rocket projector.

Fig. 3 is an enlarged cross sectional view taken along the plane 3—3 of Fig. 1.

Fig. 4 is an enlarged fragmentary longitudinal sectional view taken along the plane 4—4 of Fig. 3.

Fig. 5 is an enlarged fragmentary side elevational view of the loading gate.

Fig. 6 is a cross sectional view taken along the plane 6—6 of Fig. 5.

Fig. 7 is an enlarged detail view taken along the plane 7—7 of Fig. 5.

Fig. 8 is an enlarged detail fragmentary view showing the percussion firing mechanism in relation to a rocket projectile positioned within the rocket projector.

Fig. 9 is an enlarged detail view of the percussion firing mechanism shown in Fig. 8.

This invention essentially comprises a long projector tube pivotally mounted in a yoke which is rotatably mounted in a tripod. Each end of the projector tube is open and one end of said tube is pivotally connected to a large horizontal deflector. An elevating mechanism is mounted on top of the deflector and connection is made to the projector tube to elevate or depress such tube. The projector tube is readily traversed in azimuth by a crank thru a gear train connecting the movable yoke with a stationary tripod. A loading gate is provided on the projector tube to facilitate loading a rocket projectile into such tube.

There is shown in assembled relation in Fig. 1 a rocket projector embodying this invention. A cylindrical tube 1 is provided to direct the initial flight of a rocket projectile 2 shown in dotted outline in Fig. 1. Tube 1 is preferably of such length as to permit complete burning of the rocket propellent of rocket projectile 2 before such projectile leaves tube 1. A pair of brackets 3 are secured to the rear end of tube 1 preferably by welding as shown in Figs. 1 and 2. Brackets 3 are oppositely disposed and form a U-shape as shown in top elevation in Fig. 2. A stiffening web 4 is welded to each bracket 3 as shown in Fig. 2.

Tube 1 is pivotally mounted on a yoke 5. The yoke 5 comprises a semi-cylindrical portion 6 and a stem 14 vertically secured to the underside of the semi-cylindrical portion 6. A boss 7 is secured as by welding to the upper portion of each side of yoke 5 to provide a suitable bearing surface between each bracket 3 and yoke 5. A horizontal pin 8 is suitably secured in each boss 7 projecting outwardly from yoke 5 to pivotally engage each bracket 3 on said yoke. Thus tube 1 is pivotally secured to yoke 5 about a horizontal axis.

Stem portion 14 of yoke 5 is vertically mounted in a hub 9 of a tripod mount 10. Tripod mount 10 comprises the hub 9 and three radially extending legs 11, 12, and 13 equally disposed around hub 9. Such legs are preferably secured to hub 9 by welding. The lower end of stem portion 14 is of reduced diameter and is provided with thread 15. A washer 16 surrounds stem portion 14 adjacent the bottom of hub 9. A pair of nuts 17 are screwed onto thread 15 of stem portion 14 pivotally securing the yoke 5 to tripod mount 10 on a vertical axis. A boss 18 is secured to the outer end of legs 11, 12, and 13 preferably by a bolt 19. A vertically threaded hole 20 is provided in each boss 18 in which is screwed a threaded elevating rod 21. A crank 22 is provided preferably integrally formed on the upper end of each rod 21. The lower end of each elevating rod 21 is secured to a suitable foot 24 as by a ball and socket joint 23.

To traverse tube 1 a traversing mechanism 25 as shown in Figs. 1 and 3 is provided. Such mechanism essentially comprises a crank 26, a spur gear 27, and a ring gear 28. Ring gear 28 surrounds stem portion 14 and is fixedly secured to top of hub 9. An annular housing 29 surrounds ring gear 28, such housing comprising a ring portion 30 having an integral vertical flange 31. The ring portion 30 is secured to top of hub 9 as by bolts 32. A cover 33 is placed over flanged ring 30 which is held thereon by stem portion 14 of yoke 5.

A shaft 34 is vertically supported near the outside edge of ring gear 28 in a bracket 35. Bracket 35 is preferably secured to stem portion 14 of yoke 5 by welding. The shaft 34 passes thru an integral boss 36 provided on the top of cover 33. The spur gear 27 is suitably secured to the lower end of shaft 34 and engages ring gear 28. Crank 26 is obliquely mounted to the upper portion of semi-cylindrical member 6 of yoke 5 by a bracket 37. Such bracket is secured to the member 6 as by a bolt 38. Connection is made between vertical shaft 34 and crank 26 by a conventional universal joint 39. By turning crank 26 spur gear 27 revolves about the periphery of ring gear 28 and thru the connection of shaft 34 to stem 14 by bracket 35, yoke 5 and hence tube 1 are rotated to permit adjustment in azimuth for sighting purposes.

A deflector 40 is mounted within the semi-cylindrical member 6 of yoke 5. The deflector 40 is a tubular member of substantially larger diameter than that of tube 1 and such deflector is preferably welded to the inside of the member 6. The rear end of deflector 40 is flared outwardly as shown at 41 in Figs. 1 and 2. The forward end of deflector 40 is slotted as shown at 42 to permit tube 1 to enter the forward end of such deflector. The forward end of deflector 40 is arcuately formed as shown in Fig. 1 to permit tube 1 to be raised from a horizontal position to a nearly vertical position as shown in such figure in dotted outline. The rocket gases are therefore always discharged parallel to the ground and at the same vertical level regardless of the elevational position of the projector tube 1.

To raise tube 1 an elevating mechanism is mounted on top of deflector 40. The elevating mechanism essentially comprises a threaded elevating shaft 43 mounted within a housing 44, shaft 43 arranged to be rotated by a crank 45 thru a gearing connection to such shaft. Housing 44 is of substantially rectangular shape and is pivotally mounted within a U-shaped bracket 46 (Fig. 3). Bracket 46 is mounted on top of deflector 40 and is secured thereto preferably by welding. On opposite sides of housing 44 there are suitably secured thereto horizontal pins 47. Pins 47 are constructed to be in suitable recesses on top of bracket 46. A semi-circular clamp 48 is then placed over each of pins 47 and such clamp is secured to bracket 46 as by bolts 49. Thus housing 44 is pivotally secured to bracket 46.

Housing 44 is provided with a hole 50 on its longitudinal axis to permit threaded shaft 43 to pass thru such housing. The hole 50 is counterbored from the rear end of housing 44 to a substantial depth and a bearing 51 is inserted therein. A bevel gear 52 having an integral hub portion 53 is placed within bearing 51. An axial threaded hole 54 in bevel gear 52 cooperates with threaded shaft 43. Another bevel gear 55 cooperating with bevel gear 52 lies within housing 44 and is keyed to the crank 45 which passes thru an integral boss 56 provided on the side of housing 44. The forward end of threaded shaft 43 is pivotally secured to a bifurcated lug 57 provided on top of tube 1.

A helical tension spring 58 surrounds threaded shaft 43 and is secured between lug 57 and the forward face of housing 44. Spring 58 is provided to facilitate raising tube 1. Spring 58 is suitably secured to housing 44 and lug 57 so that such spring will exert a tension force at all times. Thus it may be readily seen that by turning crank 45, threaded shaft 43 can be readily screwed in and out of housing 44 thru the connection of gears 55 and 52 to raise or lower tube 1 to any elevation desired within the limit of travel as shown in dotted outline in Fig. 1. A flexible cover 115 including an expander spring 59 may be provided to enclose shaft 43 between housing 44 and lug 57.

To facilitate insertion of the rocket projectile 2 into tube 1 in proper relationship to the firing mechanism to be described, a loading gate 60 is provided. An opening comprising substantially one-half of the circumference of tube 1 and of a length to accommodate the rocket projectile 2 is provided in tube 1. Such opening is closed by a cover 61 comprising inner and outer members 62 and 63 respectively of substantially semi-cylindrical construction. The inner member 62 is of the same arcuate configuration as tube 1 and snugly fits the opening above mentioned. The member 63 surrounding the outer periphery of such inner member overlaps each side of the inner member 62 as shown in Fig. 6. A plurality of straps 64 surround the outer periphery of cover 61 and are preferably evenly spaced along the length thereof as shown in Figs 1 and 2. Each strap 64 is secured to cover 61 by bolts 65 as shown in Fig. 6. The left end of each strap 64 as shown in Fig. 6 is provided with a hinge joint 66. A plurality of straps 67 similar to straps 64 are secured to the underside of tube 1 as by bolts 68. The left end of such straps is hinged to the upper strap 64 as by a pin 69. A plurality of lugs 70 shaped as shown in Fig. 6 are provided on the hinged edge of cover 61 to limit the extent that cover 61 can be raised.

The cover 61 is locked to tube 1 by a plurality of links 71. The links 71 are hinged by pins 81 to bifurcated lugs 72 which are suitably secured to straps 64 as by welding. The other ends of links 71 are pivotally mounted to a locking bar 74, such links being mounted on longitudinal pins 75 which pass thru a plurality of integral lugs 76 on bar 74 located opposite each link 71. An integral longitudinal shoulder 74a is provided on the underside of bar 74. A plurality of adjusting screws 79 are equally disposed along the length of shoulder 74a and such screws bear against a locking bar 78. Locking bar 78 is secured to the underside of bar 74 by a plurality of equally disposed screws 77. Screws 77 pass thru slotted holes in bar 74 and engage suitably threaded holes in locking bar 78. The slotted holes in bar 74 permit circumferential adjustment of locking bar 78. The forward edge of locking bar 78 is sloped as shown in Fig. 6. A handle 82 is secured to the center of bar 74 as shown in Figs. 5 and 6 to facilitate raising cover 61. With handle 82 in the lowered or locked position as shown in Fig. 6, the sloped forward edge of locking bar 78 cooperates with a corresponding sloped edge on a locking bar 78a longitudinally secured to each strap 67 as by welding. In the locked position shown in Fig. 6 locking bar 78 is readily adjusted to insure that cover 61 will be maintained in the closed position while firing a rocket projectile in the projector. Such adjustment is made by unloosening screws 77 and tightening screws 79 until the sloped forward edge of locking bar 78 snugly engages the corresponding sloped surface on the corresponding locking member 78a. When properly adjusted, screws 77 are firmly tightened to secure locking bar 78 in the proper position. The cover 61 is then readily unlocked by raising handle 82. Such unlocking is readily effected because the point of engagement of the locking bar 78 and the locking member 78a lies outside of a line between the centers of pins 75 and 81. Straps 64 are loosely secured to cover 61 by virtue of slotted holes in straps 64 thru which bolts 65 are inserted. It is this looseness of fit which permits a better engagement of cover 61 and facilitates locking such cover in the locked position. An integral lug 80 is provided on the upper end of links 71 to limit the rotational movement of links 71 about pins 81.

To load a rocket projectile into tube 1, handle 82 is raised upwardly or in a counterclockwise direction as shown in Fig. 6. Unlocking is readily effected as the engagement of locking bar 78 with locking member 78a is not on the same line as the centers of pins 75 and 81, hence bar 74 and locking bar 78 is rotated out of engagement with locking member 78a by links 71. When lug 80 on each link 71 strikes each strap 64 rotational movement is then imparted to cover 61 thereby opening such cover. When lug 70 strikes the side of tube 1 further movement of cover 61 is arrested. Such lug also serves to hold cover 61 in the open position for convenience in loading a projectile into tube 1. The fully open position of such cover is shown in dotted outline in Fig. 6.

The type of firing mechanism utilized with this rocket projectile is a percussion type of mechanism and such mechanism is shown in detail in Figs. 8 and 9. The mechanism shown in such figure comprises essentially a hammer 83, a sear 84, and a sear release member 85. This mechanism is contained within a horizontal housing 86 of substantially rectangular configuration which is secured to the underside of tube 1 as by welding. Hammer 83 is pivotally mounted on transverse pin 87. In the cocked position hammer 83 lies horizontally along the underside of tube 1. A suitable opening is provided in the underside of tube 1 to permit hammer 83 to be biased upwardly into tube 1 to strike a primer 88 of rocket projectile 2. An integral lug 89 is provided on hammer 83 opposite pin 87 as shown in Fig. 8. A spring 90 disposed horizontally within housing 86 is secured to lug 89 and to the rear end of housing 86 and such spring provides the bias to hammer 83 to effect discharge of rocket projectile 2.

The sear 84 is horizontally mounted between two downwardly projecting brackets 91 and 92. The brackets 91 and 92 are secured to the top of housing 86 and preferably by welding. The rear end 93 of sear 84 engages a sear notch 94 provided in the pivoted end of hammer 83. A helical spring 95 is placed about sear 84 and engages a split washer 110 secured to sear 84 so as to bias the sear 84 rearwardly into engagement with sear notch 94 of hammer 83. An integral downwardly projecting lug 96 is provided on the forward end of sear 84 which is engaged by a disconnector member 97. The disconnector member 97 is pivotally mounted on a horizontal sear release member 98 by a pin 99. Disconnector 97 rests upon a sloped upper surface 101 of a stud 100.

Sear release member 98 is horizontally mounted between two spaced brackets 102 preferably welded to the bottom of housing 86. A helical spring 103 surrounds member 98 and works between the forward bracket 102 and a split washer 111 connected to member 98 so as to bias the member 98 rearwardly. A spring 104 is suitably secured to disconnector 97 and to release member 98 to bias disconnector 97 upwardly. A lanyard 105 is suitably secured to the forward end of sear release member 98. Such lanyard passes over a pulley 106 which is provided to reduce friction where lanyard 105 emerges thru a suitable hole in the forward end of housing 86.

With hammer 83 in the horizontal or cocked position as shown in Fig. 8 release of such hammer is effected when lanyard 105 is pulled downwardly. This moves sear release member 98 and disconnector 97 forwardly against the bias of spring 103. Forward movement of disconnector 97 likewise produces a forward movement of sear 84. Disconnector 97 is thus forced to ride upwardly along the sloped surface 101 of stud 100. This movement forces the forward end of disconnector 97 to drop off the lower end of lug 96 of sear 84. However just before disconnector 97 is dropped out of contact with the end of lug 96 of sear member 84, the sloped end 93 of sear 84 becomes disengaged from sear notch 94 on hammer 83. Thus hammer 83 is biased upwardly by spring 90 whereby hammer 83 effects discharge of rocket projectile 2. When disconnector 97 slides off the end of lug 96 sear 84 is then forced rearwardly under the bias of spring 95 to bear against the rounded end of hammer 83 in position to engage sear notch 94 when hammer 83 is pivoted rearwardly about the pin 87 by the action of the gas blast. Upon release of lanyard 105 spring 103 biases member 98 rearwardly. Disconnector 97 is then biased counterclockwise by spring 104 to again engage lug 96. If desired a cocking handle 107 as shown in Fig. 1 may be suitably mounted on the outside of housing 86 to manually lower hammer 83 to the cocked position shown in Fig. 8.

It is readily apparent from the foregoing description that a rocket projector capable of launching rocket projectiles of large caliber and one that is readily and conveniently sighted is hereby provided. The tripod on which this projector is mounted may be readily set up and adjusted even on rough terrain by individual adjustment of any one of feet 24 by means of crank 22. Adjustment for azimuth is quickly made by turning crank 26. Likewise elevation adjustment is conveniently obtained by rotation of crank 45 to elevate or depress tube 1 as may be desired. The proper elevation of tube 1 may be readily adjusted by use of a clinometer or by a suitable sight affixed to the projector. The gas blast resulting from discharge of rocket projectile 2 is discharged thru deflector 40 with a minimum of overturning force regardless of the elevation of tube 1.

It is also apparent that the firing mechanism disclosed herein is of simple, rugged construction and is semi-automatic in action being cocked by the gas blast of the discharged projectile thereby leaving the operator free to devote his entire attention to loading and sighting the projector. It is further desired to point out that the rocket projector herein described may be readily mounted on a wheeled mount by mere substitution of such mount for tripod 10.

We claim:

1. In a pivotally mounted rocket projector tube having open ends, a gas deflector mounted in cooperative relationship to the rear end of said projector tube, said gas deflector constructed and arranged to discharge rocket gases in substantially the same direction with respect to the ground independent of the elevation of said projector tube.

2. In a rocket projector tube, pivotal mounting means, a yoke, said yoke having a cylindrical stem cooperating with said pivotal mounting means, a gas deflector mounted on said yoke in cooperative relationship to the rear end of said projector tube, said gas deflector constructed and arranged to discharge the rocket gases in a plane substantially parallel with the ground independent of the elevational position of said projector tube.

3. In a pivotally mounted rocket projector tube, a yoke, said yoke rotatably supporting a gas deflector, said gas deflector comprising a tubular member having an arcuately formed closed forward end slotted to receive the rear end of said projector tube for vertical movement therein and having its hear end opened and flared outwardly, said gas deflector constructed and arranged to discharge the rocket gases in the same plane with respect to the ground independent of the elevation of said projector tube.

4. A gas deflector for a rocket projector, said gas deflector comprising a tubular member, one end of said tubular member arcuately formed and slotted to receive the discharge end of said rocket projector for vertical movement therein, the opposite end of said member outwardly flared for discharge of rocket gases, said gas deflector arranged to discharge rocket gas in a fixed plane regardless of the elevational position of said rocket projector.

LESLIE A. SKINNER.
JULIUS A. FOLSE.

REFERENCES CITED

The following references are of record in the file of this patent:

UNITED STATES PATENTS

| Number | Name | Date |
|---|---|---|
| 16,070 | Scharffe | Nov. 11, 1856 |
| 932,270 | Goodwin | Aug. 24, 1909 |
| 1,395,630 | Davis | Nov. 1, 1921 |
| 1,500,711 | Lafitte | July 8, 1924 |
| 1,661,091 | Riabouchinski | Feb. 28, 1928 |
| 2,030,507 | Driggs | Feb. 11, 1936 |

FOREIGN PATENTS

| Number | Country | Date |
|---|---|---|
| 25,326 | Great Britain | 1894 |
| 323,399 | Germany | July 22, 1920 |
| 464,543 | Great Britain | Apr. 20, 1937 |

OTHER REFERENCES

Popular Science, July 1943, pp. 50–54, "Rocket weapons, etc."